United States Patent [19]

Bloch et al.

[11] Patent Number: 4,606,153

[45] Date of Patent: Aug. 19, 1986

[54] METHOD FOR CONTROLLING A GRINDING STROKE IN A GEAR TOOTH FLANK GRINDING MACHINE OPERATING ON THE INDEXING GENERATING PRINCIPLE

[75] Inventors: Peter Bloch, Mutschellen; Robert Wydler, Zürich, both of Switzerland

[73] Assignee: MAAG Gear-Wheel & Machine Company Limited, Zürich, Switzerland

[21] Appl. No.: 624,763

[22] Filed: Jun. 26, 1984

[30] Foreign Application Priority Data

Jul. 8, 1983 [CH] Switzerland .......................... 3760/83

[51] Int. Cl.⁴ .............................................. B24B 19/00
[52] U.S. Cl. ...................................... 51/287; 51/165.77
[58] Field of Search ................. 51/34 R, 40, 42, 52 R, 51/56.6, 165.77, 287, 165 R, 165.71

[56] References Cited

U.S. PATENT DOCUMENTS

| | | | |
|---|---|---|---|
| 3,753,319 | 8/1973 | Mesey | 51/42 |
| 3,763,598 | 10/1973 | Hofler | 51/287 X |
| 3,916,569 | 11/1975 | Wydler et al. | 51/287 X |
| 4,175,537 | 11/1979 | Wrener | 51/287 X |
| 4,467,568 | 8/1984 | Bloch et al. | 51/287 |

FOREIGN PATENT DOCUMENTS

| | | |
|---|---|---|
| 1777374 | 8/1973 | Fed. Rep. of Germany . |
| 2307493 | 3/1974 | Fed. Rep. of Germany ..... 51/52 R |
| 2433603 | 1/1976 | Fed. Rep. of Germany ..... 51/52 R |
| 3142384 | 4/1983 | Fed. Rep. of Germany . |

*Primary Examiner*—Robert P. Olszewski
*Attorney, Agent, or Firm*—Werner W. Kleeman

[57] ABSTRACT

A doubly dished or double-cone grinding wheel or a pair of singly dished or single-cone grinding wheels are reciprocated in strokes along the tooth flanks or a helically toothed gear wheel to grind the gear. The stroke motion is controlled in dependence of measured values of the generating motion and of the momentary position of the grinding wheel or wheel pair upon the tooth flank being ground. For this purpose, a grinding reference polygon determining the grinding stroke limits is constructed from the gearing specifications or data. An effective grinding point of the grinding wheel or wheel pair is then determined at short time intervals from measurements of the momentary generating and stroke position of the machine. The spacing of this effective grinding point from the subsequent grinding stroke limit in the grinding stroke direction is determined. Finally, the grinding stroke motion is controlled in its path and speed such that it reverses at each grinding stroke limit defined by the grinding reference polygon.

4 Claims, 13 Drawing Figures

METHOD FOR CONTROLLING A GRINDING STROKE IN A GEAR TOOTH FLANK GRINDING MACHINE OPERATING ON THE INDEXING GENERATING PRINCIPLE

CROSS-REFERENCE TO RELATED APPLICATION

This application is related to the commonly assigned, copending U.S. application Ser. No. 06/586,327, filed Mar. 5, 1984 and entitled "A METHOD FOR CONTROLLING A GRINDING STROKE IN A GEAR TOOTH FLANK GRINDING MACHINE".

BACKGROUND OF THE INVENTION

The present invention broadly relates to a method of grinding gear teeth and, more specifically, pertains to a new and improved method for controlling the magnitude and position of the grinding stroke of a gear tooth flank grinding machine operating on the indexing generating principle when grinding a helically toothed gear wheel by means of a doubly dished or doubly conical grinding wheel or a pair of singly dished or singly conical grinding wheels reciprocatable in grinding strokes along the gear tooth flanks, wherein the stroke motion is controlled in dependence of measured values of the generating motion and of the momentary position of the grinding wheel or wheel pair upon the gear tooth flank being ground.

A method of this type is described in the German Patent Publication No. 1,777,374, published Aug. 30, 1973, based upon the fact that in helically toothed gear wheels each individual tooth is curved in the form of a helix so that its flank surfaces cannot be swept or contacted over their entire length by a grinding body or wheel moving in a plane. The grinding body or wheel is therefore out of engagement during a portion of its stroke path; this portion is small in helical gearing having a large diameter and a small helix angle, but increases rapidly as the diameter decreases and the helix angle increases. In helically toothed gear wheels of usual size, the idle or ineffective path of the grinding body or wheel often amounts to the major portion of the entire stroke path and is often a multiple of the effective engagement path which is itself relatively small.

This known method therefore sets itself the object of controlling the stroke motion such that it is adapted to the momentary engagement path of the grinding body or wheel. According to the previously mentioned German Patent Publication No. 1,777,374, this object is to be fulfilled in that the magnitude and position of the stroke motion of the grinding machine ram follows or simulates the magnitude and momentary position of the effective engagement path of the grinding body or wheel upon the tooth flank being ground in dependence of the measured value of one of the components of the generating motion. How this is done in detail and why the measurement of one component of the generating motion is supposed to be sufficient is not disclosed.

SUMMARY OF THE INVENTION

Therefore, with the foregoing in mind, it is a primary object of the present invention to provide a new and improved method for controlling a grinding stroke in a gear tooth flank grinding machine operating on the indexing generating principle which does not exhibit the drawbacks and shortcomings of prior art constructions.

Another and more specific object of the present invention aims at providing a new and improved method of the previously mentioned type which is relatively simple in concept, extremely economical to realize, highly reliable in application, not readily subject to malfunction and entails a minimum of adjustment.

Now in order to implement these and still further objects of the invention, which will become more readily apparent as the description proceeds, the method of the present invention is manifested by the features that it comprises the steps of establishing a grinding reference polygon defining the grinding stroke limits according to formula Tables 1, 2, 3 and 4 from the gearing specifications or data given hereinafter, determining the effective grinding point of the grinding wheel or grinding wheel pair at short or prescribed time intervals from measurements of the momentary generation and stroke positions of the gear tooth flank grinding machine, determining the spacing of the effective grinding point from the subsequent grinding stroke limit in the direction of stroke motion and controlling the path and speed of stroke motion such that the stroke motion reverses at each grinding stroke limit defined by the grinding reference polygon, wherein the formula Tables 1 and 2 for the case where b is greater than b' are:

TABLE 1

| ZONE | UPPER GRINDING STROKE LIMIT $H_o$ |
|---|---|
| $P_0$-$P_1$ | $H_o = \dfrac{Q_2 - Q_1}{Q_2 - Q_1} \cdot \dfrac{\sin\alpha_t}{\sin\gamma} \cdot W + \dfrac{Q_1(Q_2 - Q_1)}{Q_2 - Q_1}$ $= \dfrac{\sin\alpha_t}{\sin\gamma} \cdot W + Q_1$ |
| $P_1$-$P_2$ | $H_o = \dfrac{(Q_4 + Q_7) - Q_2}{Q_7 - (Q_2 - Q_1)} \cdot \dfrac{\sin\alpha_t}{\sin\gamma} \cdot W +$ $\dfrac{Q_2 Q_7 - (Q_4 + Q_7)(Q_2 - Q_1)}{Q_7 - (Q_2 - Q_1)}$ $= \sin^2\gamma \cdot \dfrac{\sin\alpha_t}{\sin\gamma} \cdot W +$ $\dfrac{Q_2 Q_7 - (Q_4 + Q_7)(Q_2 - Q_1)}{Q_7 - (Q_2 - Q_1)}$ |
| $P_2$-$P_3$ | $H_o = \dfrac{Q_6 - (Q_4 + Q_7)}{(Q_6 - Q_4) - Q_7} \cdot \dfrac{\sin\alpha_t}{\sin\gamma} \cdot W +$ $\dfrac{(Q_4 + Q_7)(Q_6 - Q_4) - Q_6 Q_7}{(Q_6 - Q_4) - Q_7}$ $= \dfrac{\sin\alpha_t}{\sin\gamma} \cdot W + \dfrac{(Q_4 + Q_7)(Q_6 - Q_4) - Q_6 Q_7}{(Q_6 - Q_4) - Q_7}$ |
| $P_3$-$P_4$ | $H_o = \dfrac{Q_3 - Q_6}{(Q_3 + Q_1) - (Q_6 - Q_4)} \cdot \dfrac{\sin\alpha_t}{\sin\gamma} \cdot W +$ $\dfrac{Q_6(Q_3 + Q_1) - Q_3(Q_6 - Q_4)}{(Q_3 + Q_1) - (Q_6 - Q_4)}$ $= \sin^2\gamma \cdot \dfrac{\sin\alpha_t}{\sin\gamma} \cdot W +$ $\dfrac{Q_6(Q_3 + Q_1) - Q_3(Q_6 - Q_4)}{(Q_3 + Q_1) - (Q_6 - Q_4)}$ |
| $P_0$-$P_8$ | $H_o = \dfrac{-Q_3 - Q_1}{-(Q_3 + Q_1)} \cdot \dfrac{\sin\alpha_t}{\sin\gamma} \cdot W + \dfrac{-Q_1(Q_3 - Q_1)}{-(Q_3 + Q_1)}$ |

TABLE 1-continued

| ZONE | UPPER GRINDING STROKE LIMIT $H_o$ |
|---|---|
| | $= \dfrac{\sin\alpha_t}{\sin\gamma} \cdot W + Q_1$ |

TABLE 2

| ZONE | LOWER GRINDING STROKE LIMIT $H_u$ |
|---|---|
| $P_0$-$P_4$ | $H_u = \dfrac{Q_3 + Q_1}{Q_3 + Q_1} \cdot \dfrac{\sin\alpha_t}{\sin\gamma} \cdot W + \dfrac{-Q_1(Q_3 + Q_1)}{Q_3 + Q_1}$ |
| | $= \dfrac{\sin\alpha_t}{\sin\gamma} \cdot W - Q_1$ |
| $P_0$-$P_5$ | $H_u = \dfrac{-Q_2 + Q_1}{-(Q_2 - Q_1)} \cdot \dfrac{\sin\alpha_t}{\sin\gamma} \cdot W + \dfrac{Q_1(Q_2 - Q_1)}{-(Q_2 - Q_1)}$ |
| | $= \dfrac{\sin\alpha_t}{\sin\gamma} \cdot W - Q_1$ |
| $P_5$-$P_6$ | $H_u = \dfrac{-(Q_4 + Q_7) + Q_2}{-Q_7 + (Q_2 - Q_1)} \cdot \dfrac{\sin\alpha_t}{\sin\gamma} \cdot W +$ |
| | $\dfrac{Q_2Q_7 - (Q_4 + Q_7)(Q_2 - Q_1)}{-Q_7 + (Q_2 - Q_1)}$ |
| | $= \sin^2\gamma \cdot \dfrac{\sin\alpha_t}{\sin\gamma} \cdot W +$ |
| | $\dfrac{Q_2Q_7 - (Q_4 + Q_7)(Q_2 - Q_1)}{-Q_7 + (Q_2 - Q_1)}$ |
| $P_6$-$P_7$ | $H_u = \dfrac{-Q_6 + (Q_4 + Q_7)}{-(Q_6 - Q_4) + Q_7} \cdot \dfrac{\sin\alpha_t}{\sin\gamma} \cdot W +$ |
| | $\dfrac{(Q_4 + Q_7)(Q_6 - Q_4) - Q_6Q_7}{-(Q_6 - Q_4) + Q_7}$ |
| | $= \dfrac{\sin\alpha_t}{\sin\gamma} \cdot W + \dfrac{(Q_4 + Q_7)(Q_6 - Q_4) - Q_6Q_7}{-(Q_6 - Q_4) + Q_7}$ |
| $P_7$-$P_8$ | $H_u = \dfrac{-Q_3 + Q_6}{-(Q_3 + Q_1) + (Q_6 - Q_4)} \cdot \dfrac{\sin\alpha_t}{\sin\gamma} \cdot W +$ |
| | $\dfrac{Q_6(Q_3 + Q_1) - Q_3(Q_6 - Q_4)}{-(Q_3 + Q_1) + (Q_6 - Q_4)}$ |
| | $= \sin^2\gamma \cdot \dfrac{\sin\alpha_t}{\sin\gamma} \cdot W +$ |
| | $\dfrac{Q_6(Q_3 + Q_1) - Q_3(Q_6 - Q_4)}{-(Q_3 + Q_1) + (Q_6 - Q_4)}$ | and wherein the formula Tables 3 and 4 for the case where b is less than b' are:

TABLE 3

| ZONE | UPPER GRINDING STROKE LIMIT $H_o$ |
|---|---|
| $P_0$-$P_2$ | $H_o = \dfrac{(Q_4 + Q_7) - [Q_2 + (Q_1 - Q_2)\sin^2\gamma]}{Q_7} \cdot \dfrac{\sin\alpha_t}{\sin\gamma} \cdot$ |
| | $W + \dfrac{[Q_2 + (Q_1 - Q_2)\sin^2\gamma]Q_7}{Q_7}$ |
| | $= \sin^2\gamma \cdot \dfrac{\sin\alpha_t}{\sin\gamma} \cdot W + [Q_2 + (Q_1 - Q_2)\sin^2\gamma]$ |
| $P_2$-$P_3$ | $H_o = \dfrac{Q_6 - (Q_4 + Q_7)}{(Q_6 - Q_4) - Q_7} \cdot \dfrac{\sin\alpha_t}{\sin\gamma} \cdot W +$ |

TABLE 3-continued

| ZONE | UPPER GRINDING STROKE LIMIT $H_o$ |
|---|---|
| | $\dfrac{(Q_4 + Q_7)(Q_6 - Q_4) - Q_6Q_7}{(Q_6 - Q_4) - Q_7}$ |
| | $= \dfrac{\sin\alpha_t}{\sin\gamma} \cdot W + \dfrac{(Q_4 + Q_7)(Q_6 - Q_4) - Q_6Q_7}{(Q_6 - Q_4) - Q_7}$ |
| $P_3$-$P_4$ | $H_o = \dfrac{Q_3 - Q_6}{(Q_3 + Q_1) - (Q_6 - Q_4)} \cdot \dfrac{\sin\alpha_t}{\sin\gamma} \cdot W +$ |
| | $\dfrac{Q_6(Q_3 + Q_1) - Q_3(Q_6 - Q_4)}{(Q_3 + Q_1) - (Q_6 - Q_4)}$ |
| | $= \sin^2\gamma \cdot \dfrac{\sin\alpha_t}{\sin\gamma} \cdot W + \dfrac{Q_6(Q_3 + Q_1) - Q_3(Q_6 - Q_4)}{(Q_3 + Q_1) - (Q_6 - Q_4)}$ |
| $P_0$-$P_5$ | $H_o = \dfrac{Q_2 - [Q_2 + (Q_1 - Q_2)\sin^2\gamma]}{-(Q_1 - Q_2)} \cdot \dfrac{\sin\alpha_t}{\sin\gamma} \cdot W +$ |
| | $\dfrac{-[Q_2 + (Q_1 - Q_2)\sin^2\gamma](Q_1 - Q_2)}{-(Q_1 - Q_2)}$ |
| | $= \sin^2\gamma \cdot \dfrac{\sin\alpha_t}{\sin\gamma} \cdot W + [Q_2 + (Q_1 - Q_2)\sin^2\gamma]$ |
| $P_5$-$P_8$ | $H_o = \dfrac{-Q_3 - Q_2}{-(Q_3 + Q_1) + (Q_1 - Q_2)} \cdot \dfrac{\sin\alpha_t}{\sin\gamma} \cdot W +$ |
| | $\dfrac{-Q_2(Q_3 + Q_1) - Q_3(Q_1 - Q_2)}{-(Q_3 + Q_1) + (Q_1 - Q_2)}$ |
| | $= \dfrac{\sin\alpha_t}{\sin\gamma} \cdot W + \dfrac{-Q_2(Q_3 + Q_1) - Q_3(Q_1 - Q_2)}{-(Q_3 + Q_2)}$ |

TABLE 4

| ZONE | LOWER GRINDING STROKE LIMIT $H_u$ |
|---|---|
| $P_0$-$P_1$ | $H_u = \dfrac{-Q_2 + [Q_2 + (Q_1 - Q_2)\sin^2\gamma]}{(Q_1 - Q_2)} \cdot \dfrac{\sin\alpha_t}{\sin\gamma} \cdot W +$ |
| | $\dfrac{-[Q_2 + (Q_1 - Q_2)\sin^2\gamma](Q_1 - Q_2)}{(Q_1 - Q_2)}$ |
| | $= \sin^2\gamma \cdot \dfrac{\sin\alpha_t}{\sin\gamma} \cdot W - [Q_2 + (Q_1 - Q_2)\sin^2\gamma]$ |
| $P_1$-$P_4$ | $H_u = \dfrac{Q_3 + Q_2}{(Q_3 + Q_1) - (Q_1 - Q_2)} \cdot \dfrac{\sin\alpha_t}{\sin\gamma} \cdot W +$ |
| | $\dfrac{-Q_2(Q_3 + Q_1) - Q_3(Q_1 - Q_2)}{(Q_3 + Q_1) - (Q_1 - Q_2)}$ |
| | $= \dfrac{\sin\alpha_t}{\sin\gamma} \cdot W + \dfrac{-Q_2(Q_3 + Q_1) - Q_3(Q_1 - Q_2)}{Q_3 + Q_2}$ |
| $P_0$-$P_6$ | $H_u = \dfrac{-(Q_4 + Q_7) + [Q_2 + (Q_1 - Q_2)\sin^2\gamma]}{Q_7} \cdot \dfrac{\sin\alpha_t}{\sin\gamma} \cdot$ |
| | $W + \dfrac{-[Q_2 + (Q_1 - Q_2)\sin^2\gamma]Q_7}{Q_7}$ |
| | $= \sin^2\gamma \cdot \dfrac{\sin\alpha_t}{\sin\gamma} \cdot W - [Q_2 + (Q_1 - Q_2)\sin^2\gamma]$ |
| $P_6$-$P_7$ | $H_u = \dfrac{-Q_6 + (Q_4 + Q_7)}{-(Q_6 - Q_4) + Q_7} \cdot \dfrac{\sin\alpha_t}{\sin\gamma} \cdot W +$ |
| | $\dfrac{(Q_4 + Q_7)(Q_6 - Q_4) - Q_6Q_7}{-(Q_6 - Q_4) + Q_7}$ |

TABLE 4-continued

| ZONE | LOWER GRINDING STROKE LIMIT $H_u$ |
|---|---|
| | $= \dfrac{\sin\alpha_t}{\sin\gamma} \cdot W + \dfrac{(Q_4 + Q_7)(Q_6 - Q_4) - Q_6 Q_7}{-(Q_6 - Q_4) + Q_7}$ |
| $P_7-P_8$ | $H_u = \dfrac{-Q_3 + Q_6}{-(Q_3 + Q_1) + (Q_6 - Q_4)} \cdot \dfrac{\sin\alpha_t}{\sin\gamma} \cdot W +$ |
| | $\dfrac{Q_6(Q_3 + Q_1) - Q_3(Q_6 - Q_4)}{-(Q_3 + Q_1) + (Q_6 - Q_4)}$ |
| | $= \sin^2\gamma \cdot \dfrac{\sin\alpha_t}{\sin\gamma} \cdot W +$ |
| | $\dfrac{Q_6(Q_3 + Q_1) - Q_3(Q_6 - Q_4)}{-(Q_3 + Q_1) + (Q_6 - Q_4)}$ |

The grinding reference polygon is preferably an octagonal figure.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that to simplify the showing thereof only enough of the the structure of the gear tooth grinding machine has been illustrated therein as is needed to enable one skilled in the art to readily understand the underlying principles and concepts of this invention. Turning now specifically to FIG. 1 of the drawings, the tool standard basic rack tooth profile illustrated therein by way of example and not limitation and employed to realize the method as hereinbefore described has associated with it a generation plane upon which the pitch cylinder of the gear wheel to be generated can roll according to FIG. 2. According to the well-known rules of involute geometry, tooth flanks with involute profiles are thereby generated on the gear wheel. When using a grinding wheel in the form of two singly conical or singly dished grinding disks or in the form of a single doubly conical or doubly dished grinding disk for grinding, the profile of the grinding wheel in a section normal to the direction of motion of the grinding wheel corresponds to or simulates the tool standard basic rack tooth profile forming the conjugate generating profile normal to the helical gear tooth space.

Figure 1A:
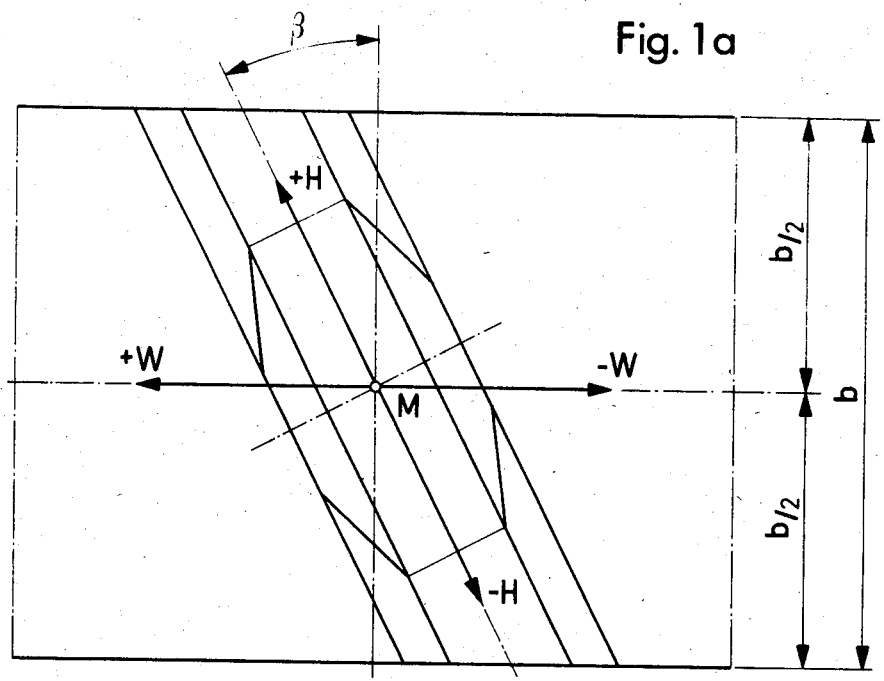
FIG. 1a schematically shows a side view of a helically toothed gear wheel together with the associated tool standard basic rack tooth profile.
Figure 1B:
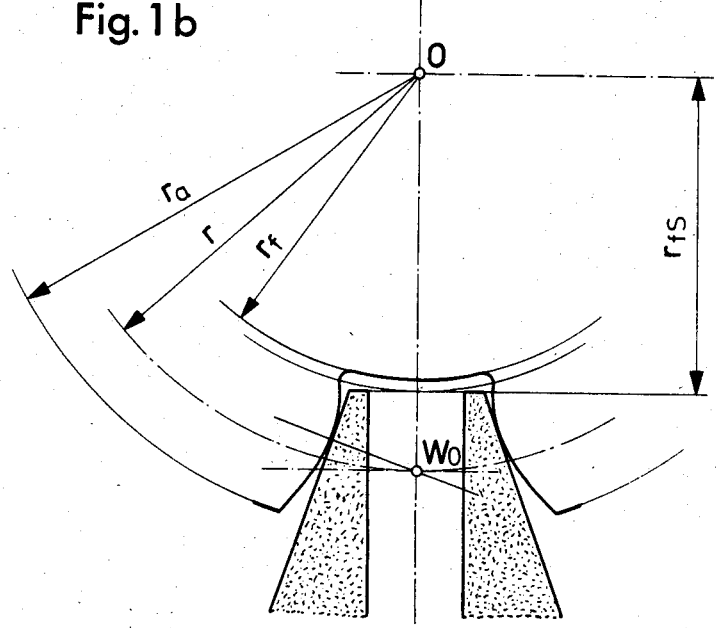
FIG. 1b schematically shows a partial plan view of the gear wheel.

In FIGS 1a and 1b the symmetry point M of the grinding disks, the center or central point O of the gear wheel being ground and the pitch point or generation point $W_o$ are represented. When these three points M, O and $W_o$ are in mutual alignment and, in addition, the symmetry point M of the grinding disks is in the center of the gear wheel width b, then an absolute symmetry position exists in relation to generating path or travel ($\pm W$) and to the grinding stroke ($\pm H$). The following explanations are valid for grinding with a pair of singly dished or singly conical grinding disks and, in analogous manner, are also valid for grinding with a single doubly dished or doubly conical grinding disk.

The absolute symmetry position is determined for each gear wheel to be ground on the grinding machine in that the symmetry point M of the grinding disk or disks is positioned as precisely as possible in the center of the gear wheel width b and the grinding disks are rolled into the gear wheel to be ground from one side and out the other side in such position. At the first contact of one of the grinding disks with a gear tooth flank, the generation path position is noted and is noted again at the last point of contact of the other grinding disk (or other side of the single grinding disk) with the opposing tooth flank. The average value of both noted values represents the symmetry position in relation to the generating path or travel W.

Figure 2:
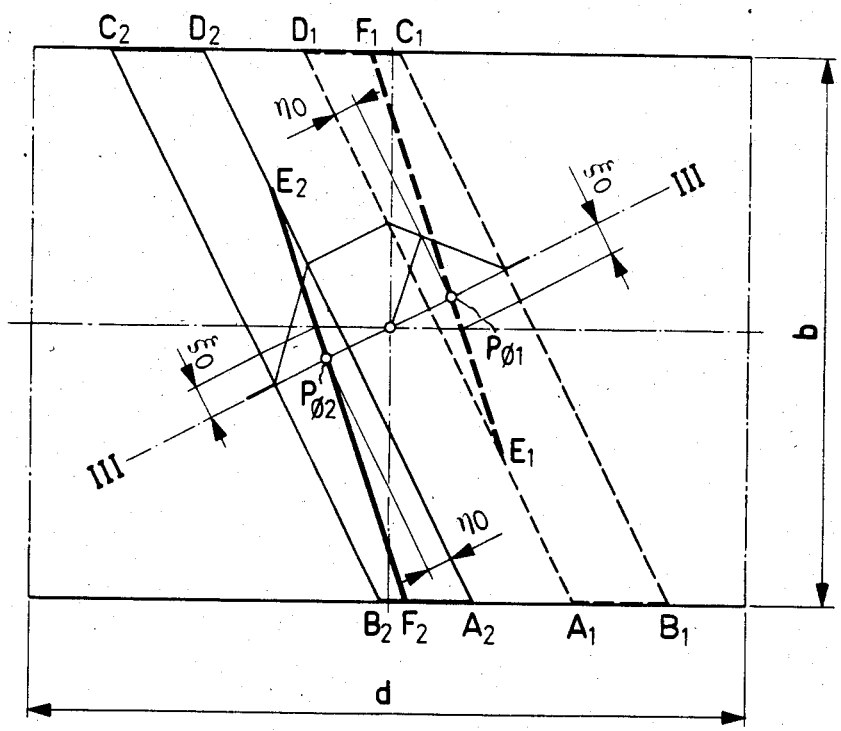
FIG. 2 schematically shows a side view corresponding to FIG. 1a with the tool standard basic rack tooth profile in a symmetry position.

In FIG. 2 a plan view of the tool standard basic rack tooth profile is represented upon the basis of this symmetry position, wherein the lines of contact between two flanks of the tool standard basic rack tooth profile and associated ones of the grinding wheel flanks in the generating path symmetry position are indicated. The points of impingement of the normal extending through the pitch point or generation point $W_o$ upon this basic rack tooth profile flank are designated as $P_{01}$ and $P_{02}$.

The peripheries or borders of one tool standard basic rack tooth profile flank 1 have the apices $A_1$, $B_1$, $C_1$ and $D_1$; $A_1 D_1$ represents the root line of the tooth flank 1. The peripheries or borders of the other basic rack tooth profile flank 2 have the apices $A_2$, $B_2$, $C_2$ and $D_2$; $A_2 D_2$ represents the root line of the tooth flank 2.

Figure 3:
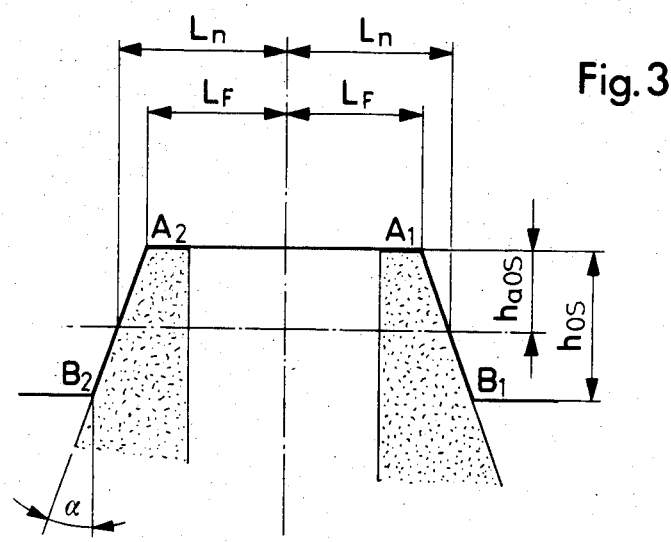
FIG. 3 shows a normal section taken along the line III—III in FIG. 2.

In FIG. 3, two singly dished or singly conical grinding disks are each in contact with one of the basic rack tooth profile flanks 1 and 2. A line connecting the tooth top-land edge points $A_1$ and $A_2$ of the conjugate rack touches the gear wheel at the grinding root circle having the radius $r_{fS}$ (FIG. 1b), which usually does not coincide with the root circle radius $r_f$ of standard gear geometry, since only the involute portion of the tooth flank (including a prescribable supplement or overrun) is ground. Usually a short trochoidal transition to the gear tooth root fillet is interposed. The points $B_1$ and $B_2$ represent tooth top-land edge points of the gear wheel or workpiece side flanks. The flank half-spacing $L_n$ upon the pitch line of the tooth represented in FIG. 3 derives from the gear wheel specifications or data which are usually prescribed when generating gearing.

For the determination of the effective grinding point S upon the tool standard basic rack tooth profile flank, reference is made to German Patent Publication No. 3,142,384, which is incorporated herein by reference.

Figure 4:
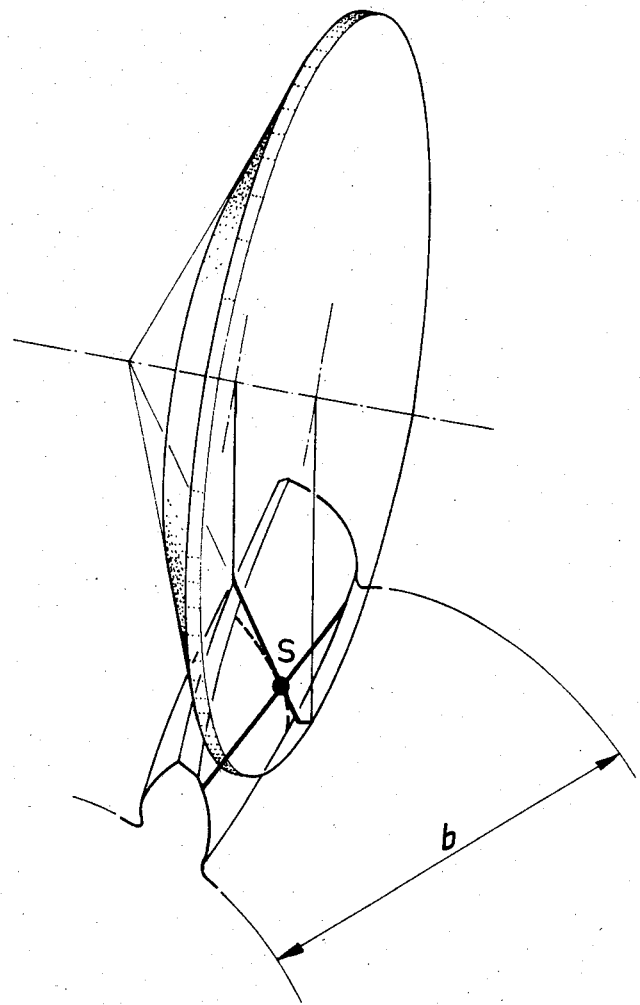
FIG. 4 is a perspective view of a single tooth of the gear wheel.

In FIG. 4, a flank contact line between a reference or standard basic rack tooth profile flank and a gear wheel tooth flank of a gear wheel being ground is represented in solid line and the line of contact between the reference or standard basic rack tooth profile flank and the associated conical grinding disk is represented in broken line; the crossing point of these two lines is the effective grinding point S.

In each generation position W, the reference or standard basic rack tooth profile flank touches the gear wheel tooth flank in a certain flank contact line. The latter is a generatrix of the involute surface and is represented in FIG. 2 for the generation symmetry position. According to FIG. 4, the contact line of the conical grinding disk with the tool standard basic rack tooth profile flank is a straight line, namely the meridian line or profile contour in normal section through the grinding disk. The momentary contact point of the grinding disk with the gear wheel tooth flank, the effective grinding point S, is situated at the crossing point of these two lines.

The following input values are required for computing the grinding stroke limits:
  Module in normal section: m
  Standard pressure: $\alpha$
  Number of teeth: z
  Helix angle: $\beta$
  Tooth tip or addendum diameter: $d_a$
  Grinding root circle diameter: $d_{fS}$
  Tooth width: b
  Machined tooth width: $AW_k$ When no value for $d_{fS}$ is available, one can equate:

$$d_{fS} = d - 2(h_{aP} - x)m - (0.1)m,$$

wherein;
  $h_{aP}$ is the tooth addendum depth coefficient for module 1; and
  x is the addendum modification coefficient.

Auxiliary variables or values inherent to involute geometry:

$$d = \frac{z \cdot m}{\cos\beta}$$

$$\tan\alpha_t = \frac{\tan\alpha}{\cos\beta}$$

$$d_b = d \cdot \cos\alpha_t$$

$$\cos\alpha_a = \frac{d_b}{d_a}$$

$$\tan\gamma = \sin\alpha \cdot \tan\beta$$

-continued $$L_n = 0.5 \left[ (k+1) \cdot \pi \cdot m - \frac{AW_k}{\cos\alpha} + z \cdot m \cdot \text{inv}\alpha_t \right]$$

$$h_{OS} = 0.5 [d_b(\tan\alpha_a - \tan\alpha_t)\sin\alpha_t + d - d_{fS}]$$
$$h_{aOS} = r - r_{fS}$$

Figure 5:
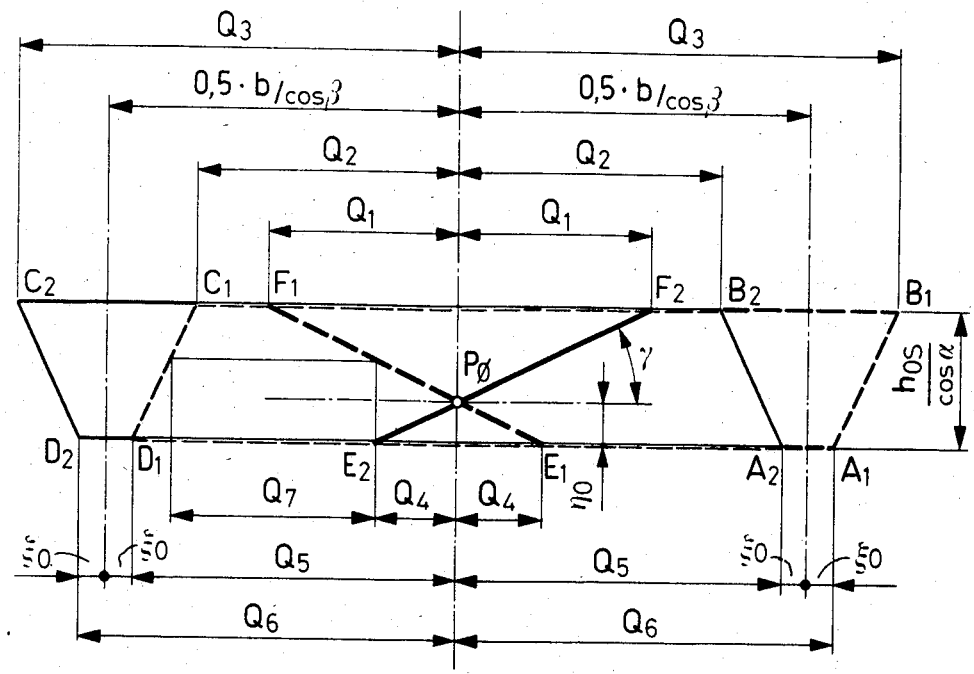
FIG. 5 diagrammatically shows the geometrical relationships of calculation variables in a first embodiment of the tool standard basic rack tooth profile.
Figure 6:
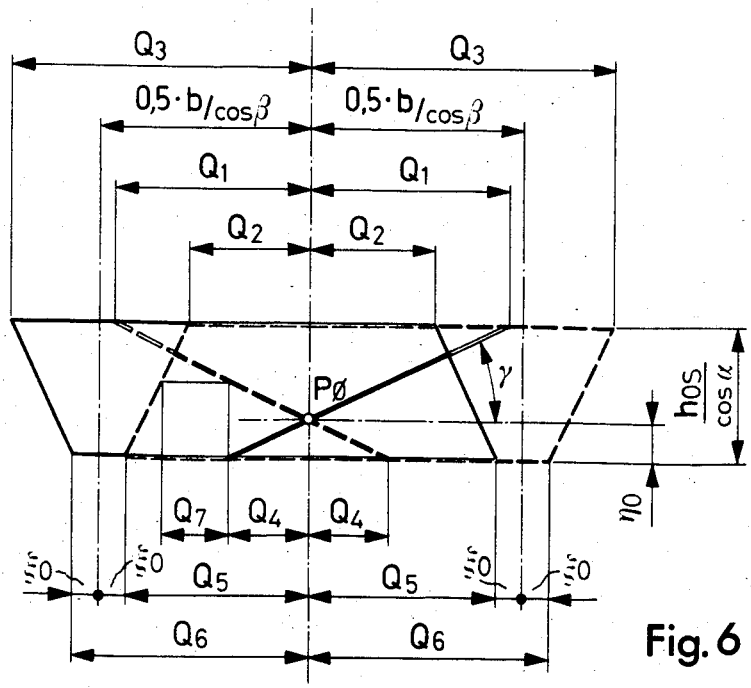
FIG. 6 diagrammatically shows the corresponding geometrical relationships of the calculation variables of a second embodiment of the tool standard basic rack tooth profile.

It is now a matter of representing the flanks of the tool standard basic rack tooth profile geometrically in plan view such that when the left- and right-hand flanks are superimposed, the reference points $P_{01}$ and $P_{02}$ coincide. In the generation path symmetry position according to FIG. 2, the flank contact lines can lie within the periphery $A_1 B_1 C_1 D_1$ or $A_2 B_2 C_2 D_2$ of the tooth flanks in their full extent as is shown in FIG. 5 or they can, as can be seen in FIG. 6, extend beyond the side flank surfaces. There are therefore—for the computation of grinding stroke limits—basically two different cases to consider. For given geometric gearing specifications or data, these two cases can be defined in relation to the tooth width b.

The limit case in which $Q_1$ equals $Q_2$ is associated with a certain tooth width designated as the critical tooth width $b'$. When the tooth width b is greater than the critical tooth width $b'$, the representation selected for FIG. 5 is valid; when it is smaller, the representation selected for FIG. 6 is valid.

The formula for computing the critical tooth width $b'$ is:

$$b' = 2 \cdot \cos\beta \left[ \frac{\frac{h_{OS}}{\cos\alpha} - \eta_0}{\tan\gamma} + \zeta_0 + h_{OS} \cdot \frac{\tan\gamma}{\tan\alpha} \right]$$

For determining the position of the flank contact lines on the flank of the tool standard basic rack tooth profile based upon the generating path symmetry position (W=O), the following auxiliary values or variables are required in connection with FIGS. 5 and 6:

$$\zeta_0 = L_F \cdot \tan\beta$$

$$\eta_0 = (h_{aOS} - L_F \cdot \tan\alpha) \cos\alpha$$

$$Q_1 = \frac{\frac{h_{OS}}{\cos\alpha} - \eta_0}{\tan\gamma}$$

$$Q_2 = 0.5 \frac{b}{\cos\beta} - \zeta_0 - \frac{h_{OS}}{\cos\alpha} \cdot \tan\gamma$$

$$Q_3 = 0.5 \frac{b}{\cos\beta} + \zeta_0 + \frac{h_{OS}}{\cos\alpha} \cdot \tan\gamma$$

$$Q_4 = \frac{\eta_0}{\tan\gamma}$$

$$Q_5 = 0.5 \cdot \frac{b}{\cos\beta} - \zeta_0$$

$$Q_6 = 0.5 \cdot \frac{b}{\cos\beta} + \zeta_0$$

$$Q_7 = Q_5 - 2\eta_0 \cdot \tan\gamma - Q_4$$

$\gamma$ = angle between flank contact line and root line wherein, in relation to grinding the gearing:
  $h_{aOS}$=whole depth coefficient or addendum height of the tool standard basic rack tooth profile; and $h_{OS}$ = whole depth of the tool standard basic rack tooth profile.

Figure 7:
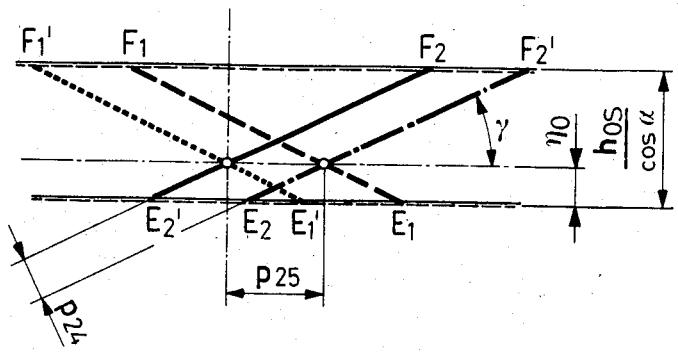
FIG. 7 diagrammatically shows a modified detail from FIGS. 5 and 6.

Based upon the statistical determination of the geometric values, the translation of the flank contact line must now be found from the reference or standard basic rack tooth profile when generating a gear wheel to be ground. The flank contact line $E_1 F_1$ of the arrangement according to FIG. 2 translates to the left when generating the gear wheel in the positive direction according to FIG. 1 upon the flank $A_1 B_1 C_1 D_1$; the flank contact line $E_2 F_2$ translates to the right upon the flank $A_2 B_2 C_2 D_2$. If the second flank is flipped-over upon the first when both points $P_{01}$ and $P_{02}$ coincide, it can be assumed that the intersection point of the two flank contact lines will move parallel to the root line. This is shown in FIG. 7 as a complement to the FIGS. 5 and 6. The generation path W is assigned the positive sign + for this generation path direction. The translation variables determined by the generating path are the algebraic variables $p_{24}$ and $p_{25}$:

$$p_{24} = W \cdot \sin\alpha_t$$

$$p_{25} = W \cdot \frac{\sin\alpha_t}{\sin\gamma}$$

Figure 8:
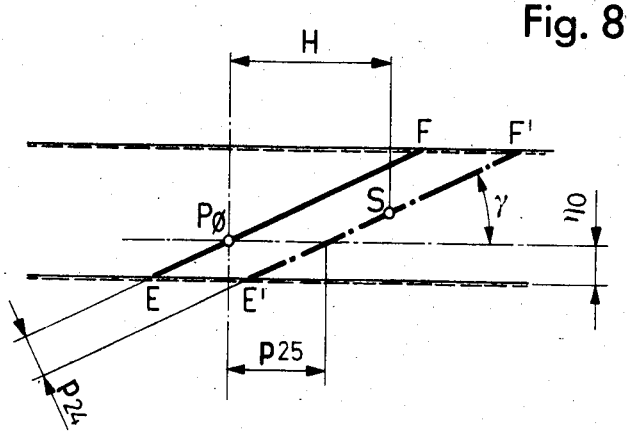
FIG. 8 diagrammatically shows a partial view of a flank of the tool standard basic rack tooth profile on an enlarged scale.

As previously mentioned, the determination of the effective grinding point of the conical grinding disk in relation to the tool standard basic rack tooth profile flank is shown in FIG. 4 visually and in FIG. 8 schematically. The effective grinding point S is situated upon the translated flank contact line E'F' at a spacing of the grinding stroke H from the perpendicular extending through $P_0$ upon the root line.

An algorithm or calculating rule must now be developed for determining the grinding stroke limits as a function of the generating path W and of the grinding stroke H. The algorithm must differentiate between flank lines associated with a right-hand flank and flank lines associated with a left-hand flank. In addition, the two possible lead angles of the helical gear wheel to be ground, i.e. left-hand lead or right-hand lead, must be considered. Furthermore, it must be differentiated whether the tooth width b is greater than or smaller than the critical tooth width b'. These differentiations lead to the following four computation cases:

|  | b > b' | b < b' |
| --- | --- | --- |
| Left grinding disk and left-handed gear | Case I | Case II |
| Right grinding disk and right-handed gear | | |
| Right grinding disk and left-handed gear | Case III | Case IV |
| Left grinding disk and right-handed gear | | |

The designations "right" and "left" grinding disks are here based upon an observer standing before the grinding machine.

Case I relates to the flank periphery $A_1 B_1 C_1 D_1$ in FIG. 2 and Case II relates to the flank periphery $A_2 B_2 C_2 D_2$.

In relation to the central position according to FIG. 1, the generation path and grinding stroke relationships are point-symmetrical in relation to stroke limitation if the values of W and H are treated algebraically and the corresponding formulae are adapted according to plus and minus rules. In Cases I and II, the mathematical signs of W and H are positive. Cases III and IV can be calculated with the same formulae as I and II, if $-H$ is inserted instead of $+H$ and $-W$ is inserted instead of $+W$ in the calculation. What was the upper grinding point limit then becomes the lower grinding point limit and vice versa.

The conclusion to be drawn from these computations is the fact that when working with dished or conical grinding wheels, a polygonal variation of the stroke limit as a function of the generation path results. The apices of the polygon are the computation reference points which are, however, not practically attained when executed upon the gear tooth flank grinding machine. The polygon apices do, however, form the framework for the determination of the stroke limiting diagram.

In practical application prescribed amounts of supplement or overrun are added to the stroke value of the corresponding polygon apices.

The polygon apices of the grinding stroke limit values are computed for the Cases I and II according to the tables A and B, respectively, given hereinafter.

Figure 9:
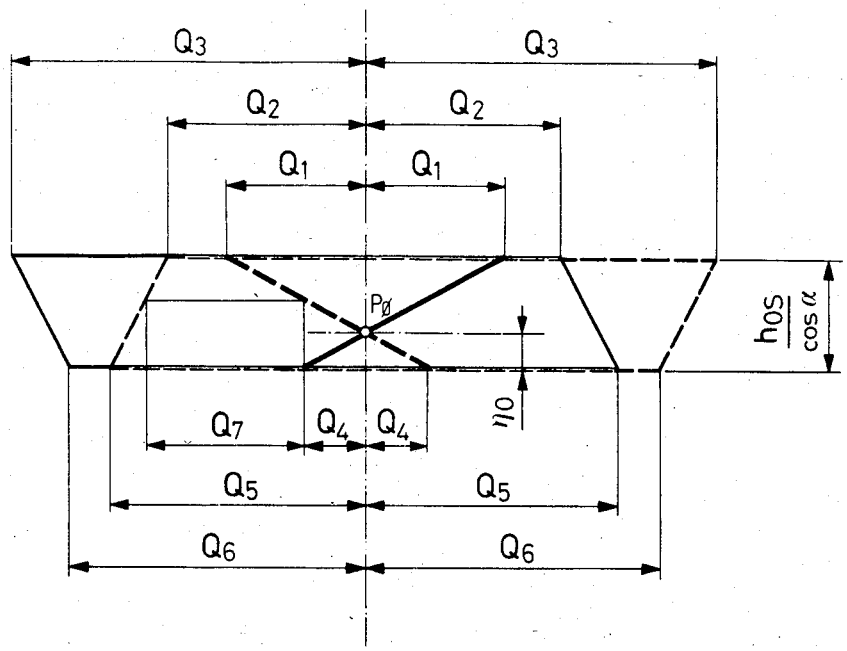
FIG. 9 diagrammatically shows geometrical indications for determining a grinding stroke limit polygon for the embodiment according to FIG. 5.
Figure 9:
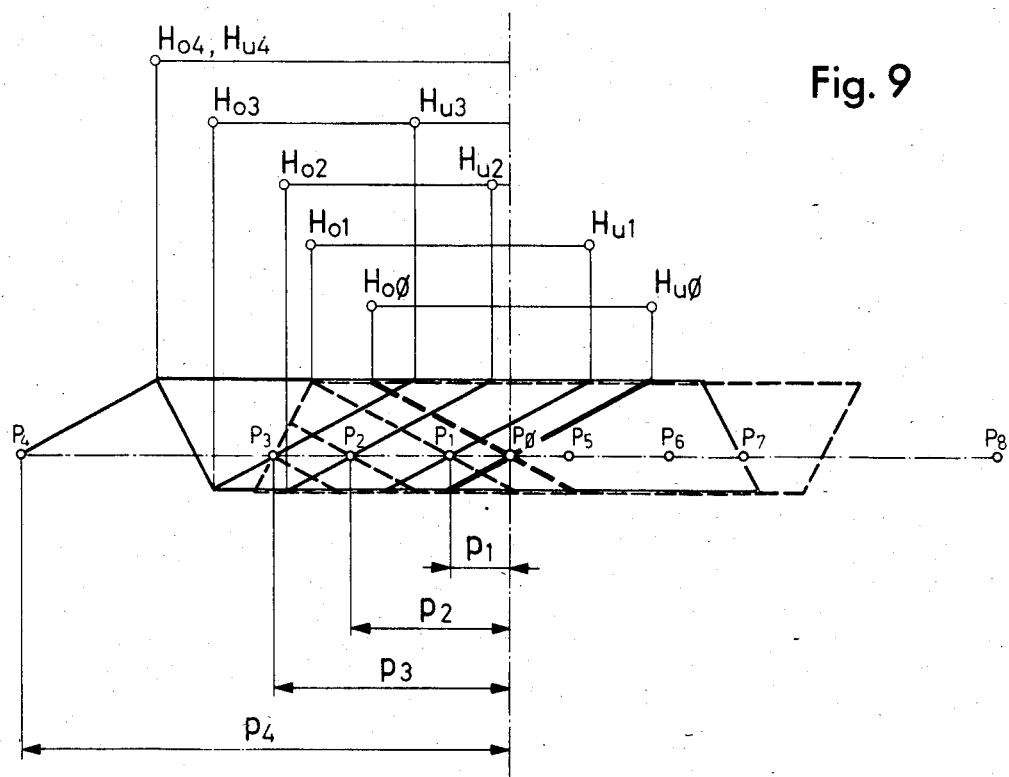

The tooth flank $A_1 B_1 C_1 D_1$ according to FIG. 2 with the tooth flank $A_2 B_2 C_2 D_2$ superimposed in broken line thereupon is shown in plan view in FIG. 9. The positive grinding stroke H extends to the left parallel to the root line and the generation path W increases positively corresponding to the sequence of the crossing points from $P_0$ to $P_4$. The distances of the crossing points from the center line are designated as $p_1$ through $p_4$. The negative generating paths correspond to the points $P_5$ through $P_8$. All of these points correspond to reference points for the variation of the grinding stroke limitation as a function of their associated generation path. The formulae for the points $P_5$ through $P_8$ are, in turn, derived from the formulae for the points $P_1$ through $P_4$ in that the negative values of $p_1$ through $p_4$ are inserted for $p_5$ through $p_8$ and the negative values of $H_{u1}$ through $H_{u4}$ are inserted for the upper grinding stroke limit values $H_{o5}$ through $H_{o8}$ or, respectively, the negative values of $H_{o1}$ through $H_{o4}$ are taken for $H_{u5}$ through $H_{u8}$.

What has just been stated in relation to Case I also applies to Case II. The sequence of the computation points $P_1$, $P_2$, respectively $P_5$, $P_6$ depends only upon the criterion $$(Q_2 - Q_1) > \text{ or } < Q_7.$$

FIG. 9 shows the determination of the apices of the stroke limiting polygon along the characteristic positions of the flank contact lines under the assumption of a super-critical tooth width b greater than b'.

Figure 10:
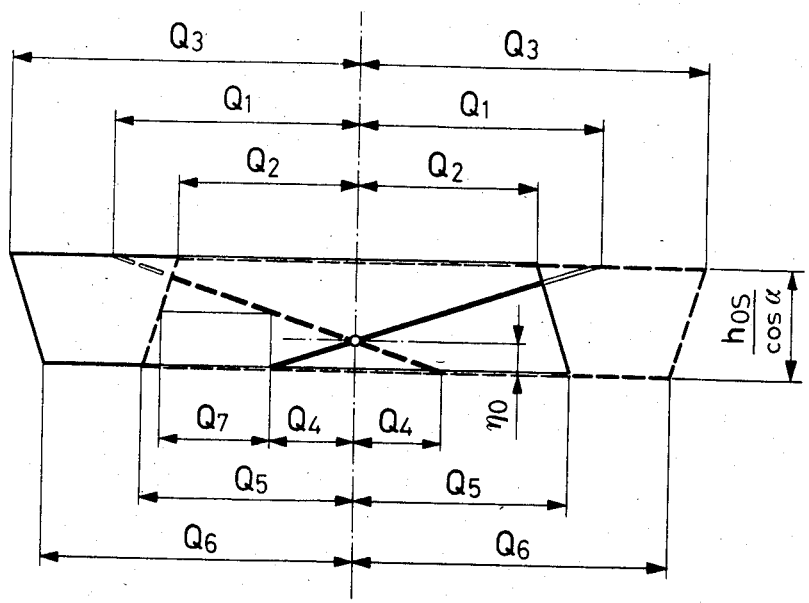
FIG. 10 diagrammatically shows geometrical indications for determining a grinding stroke limit polygon for the embodiment according to FIG. 6.
Figure 10:
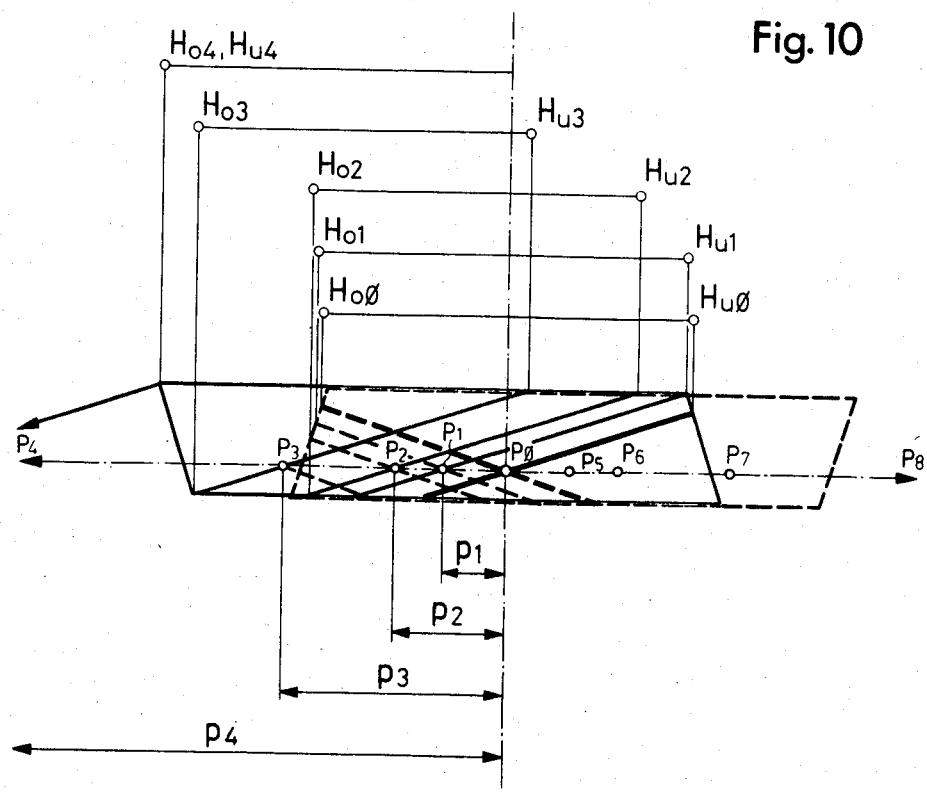

FIG. 10 shows the corresponding example for determining the reference points of the stroke limiting polygon along the characteristic positions of the flank contact lines for the subcritical tooth width b smaller than b'.

After calculating the polygon apices for these various cases, the stroke limiting polygon itself is formed between subsequent neighboring polygon apices by linearized functions, i.e. a linearized function is inserted between each two accurately determined apices and is then regarded as the definitive stroke limit. The insertion or interpolation of these defined linearized functions between each two neighboring apices has a number of advantages which can be exploited when performing measurements at the gear tooth flank grinding machine. When grinding a tooth flank, the generating path and the associated stroke position are measured at the gear tooth flank grinding machine at short time intervals, at least once per grinding stroke cycle, and then the associated position of the effective grinding point S in the field of grinding engagement is calculated. Based upon this field of grinding engagement, the distance or spacing to the linearized function can be determined each time. If the linearized function represents the grinding stroke limit, then the distance of the actual or momentary effective grinding point from the stroke limit, in particular to the subsequent stroke limit, can be determined each time if the stroke motion direction is taken into consideration.

On the basis of these measured and computed values, it is then possible to decelerate or accelerate the translatory speed of the grinding wheels or disks such that grinding takes place at the maximum translatory speed over the greatest possible portion of the effective grinding line along the tooth flank and such that the translatory speed is reduced so late and with such great deceleration that a reversal of motion occurs at the stroke limit.

TABLE A

Computation of the grinding stroke limit polygon for the super-critical tooth width $b > b'$
Boxed values = reference points

| Point | p | W | $H_o$ | $H_u$ |
|---|---|---|---|---|
| $P_0$ | $p_0 = 0$ | $W_0 = 0$ | $H_{o0} = Q_1$ | $H_{u0} = -Q_1$ |
| $P_1$ | $p_1 = (Q_2 - Q_1)$ | $W_1 = p_1 \cdot \frac{\sin\gamma}{\sin\alpha_t}$ | $\boxed{H_{o1} = Q_2}$ | $H_{u1} = (Q_2 - 2Q_1)$ |
| $P_2$ | $p_2 = Q_7$ | $W_2 = p_2 \cdot \frac{\sin\gamma}{\sin\alpha_t}$ | $\boxed{H_{o2} = (Q_4 + Q_7)}$ | $H_{u2} = (Q_7 - Q_1)$ |
| $P_3$ | $p_3 = (Q_6 - Q_4)$ | $W_3 = p_3 \cdot \frac{\sin\gamma}{\sin\alpha_t}$ | $\boxed{H_{o3} = Q_6}$ | $H_{u3} = (Q_6 - Q_4 - Q_1)$ |
| $P_4$ | $p_4 = (Q_3 + Q_1)$ | $W_4 = p_4 \cdot \frac{\sin\gamma}{\sin\alpha_t}$ | $\boxed{H_{o4} = Q_3}$ | $\boxed{H_{u4} = Q_3}$ |
| $P_5$ | $p_5 = -(Q_2 - Q_1)$ | $W_5 = p_5 \cdot \frac{\sin\gamma}{\sin\alpha_t}$ | $H_{o5} = -(Q_2 - 2Q_1)$ | $\boxed{H_{u5} = -Q_2}$ |
| $P_6$ | $p_6 = -Q_7$ | $W_6 = p_6 \cdot \frac{\sin\gamma}{\sin\alpha_t}$ | $H_{o6} = -(Q_7 - Q_1)$ | $\boxed{H_{u6} = -(Q_4 + Q_7)}$ |
| $P_7$ | $p_7 = -(Q_6 - Q_4)$ | $W_7 = p_7 \cdot \frac{\sin\gamma}{\sin\alpha_t}$ | $H_{o7} = -(Q_6 - Q_4 - Q_1)$ | $\boxed{H_{u7} = -Q_6}$ |
| $P_8$ | $p_8 = -(Q_3 + Q_1)$ | $W_8 = p_8 \cdot \frac{\sin\gamma}{\sin\alpha_t}$ | $\boxed{H_{o8} = -Q_3}$ | $\boxed{H_{u8} = -Q_3}$ |

TABLE B

Computation of the grinding stroke limit polygon for the sub-critical tooth width $b < b'$
Boxed values = reference points

| Point | p | W | $H_o$ | $H_u$ |
|---|---|---|---|---|
| $P_0$ | $p_0 = 0$ | $W_0 = 0$ | $H_{o0} = Q_2 + (Q_1 - Q_2)\sin^2\gamma$ | $H_{u0} = -[Q_2 + (Q_1 - Q_2)\sin^2\gamma]$ |
| $P_1$ resp. $P_2$ | $p_1 = (Q_1 - Q_2)$ | $W_1 = p_1 \cdot \frac{\sin\gamma}{\sin\alpha_t}$ | $H_{o1} = Q_2 + 2(Q_1 - Q_2)\sin^2\gamma$ | $\boxed{H_{u1} = -Q_2}$ |
| $P_2$ resp. $P_1$ | $p_2 = Q_7$ | $W_2 = p_2 \cdot \frac{\sin\gamma}{\sin\alpha_t}$ | $\boxed{H_{o2} = (Q_4 + Q_7)}$ | $H_{u2} = (Q_7 - Q_1)$ |
| $P_3$ | $p_3 = (Q_6 - Q_4)$ | $W_3 = p_3 \cdot \frac{\sin\gamma}{\sin\alpha_t}$ | $\boxed{H_{o3} = Q_6}$ | $H_{u3} = (Q_6 - Q_4 - Q_1)$ |
| $P_4$ | $p_4 = (Q_3 + Q_1)$ | $W_4 = p_4 \cdot \frac{\sin\gamma}{\sin\alpha_t}$ | $\boxed{H_{o4} = Q_3}$ | $\boxed{H_{u4} = Q_3}$ |
| $P_5$ resp. $P_6$ | $p_5 = -(Q_1 - Q_2)$ | $W_5 = p_5 \cdot \frac{\sin\gamma}{\sin\alpha_t}$ | $\boxed{H_{o5} = Q_2}$ | $H_{u5} = -[Q_2 + 2(Q_1 - Q_2)\sin^2\gamma]$ |
| $P_6$ resp. $P_5$ | $p_6 = -Q_7$ | $W_6 = p_6 \cdot \frac{\sin\gamma}{\sin\alpha_t}$ | $H_{o6} = -(Q_7 - Q_1)$ | $\boxed{H_{u6} = -(Q_4 + Q_7)}$ |

TABLE B-continued

Computation of the grinding stroke limit polygon for the sub-critical tooth width $b < b'$
Boxed values = reference points

| Point p | | W | $H_o$ | $H_u$ |
|---|---|---|---|---|
| $P_7$ | $p_7 = -(Q_6 - Q_4)$ | $W_7 = p_7 \cdot \dfrac{\sin\gamma}{\sin\alpha_t}$ | $H_{o7} = -(Q_6 - Q_4 - Q_1)$ | $\boxed{H_{u7} = -Q_6}$ |
| $P_8$ | $p_8 = -(Q_3 + Q_1)$ | $W_8 = p_8 \cdot \dfrac{\sin\gamma}{\sin\alpha_t}$ | $\boxed{H_{o8} = -Q_3}$ | $\boxed{H_{u8} = -Q_3}$ |

The grinding stroke limiting polygon previously alluded to can, based upon the reference points as represented in Tables A and B, be described by a system of 8 linear equations since they all have a common parameter, namely the generation path. For each generation path value there is an upper and a lower stroke limiting value (cf. Tables A and B). The distance or spacing of the momentary grinding stroke from the upper, respectively the lower, grinding stroke limit can be determined by simple mathematical considerations from the value of the momentary generation path. In practice, this is performed by a computer program for determining the distance of a point from a straight line. Furthermore, in practice, a functional line locus is established for the upper stroke limit and another for the lower stroke limit. Each of these lines has five basic reference points which are emphasized in Tables A and B by boxes. For reasons of simplification of the algorithm, the point $P_0$ is also included in Tables 1, 2, 3 and 4 although it is not a true reference point. The connection of any two reference points $P_n$ and $P_{(n+1)}$ by a linear function can be realized according to the general scheme below:

$$H = \frac{H_{(n+1)} - H_n}{W_{(n+1)} - W_n} \cdot W + \frac{H_n \cdot W_{(n+1)} - H_{(n+1)} \cdot W_n}{W_{(n+1)} - W_n}$$

The previously recited considerations must be consequentially maintained in setting-up Tables 1, 2, 3 and 4. To retain clarity and comprehensibility of the method, not all algebraic reductions of the formulae have been effected, but the following formal reductions have been performed to yield a practical form of mathematical expression:

$$\frac{(Q_4 + Q_7) - Q_2}{Q_7 - (Q_2 - Q_1)} = \sin^2\gamma$$

$$\frac{Q_3 - Q_6}{(Q_3 + Q_1) - (Q_6 - Q_4)} = \sin^2\gamma$$

$$\frac{(Q_4 + Q_7) - Q_2 + (Q_1 - Q_2) \cdot \sin^2\gamma}{Q_7} = \sin^2\gamma$$

Figure 11:
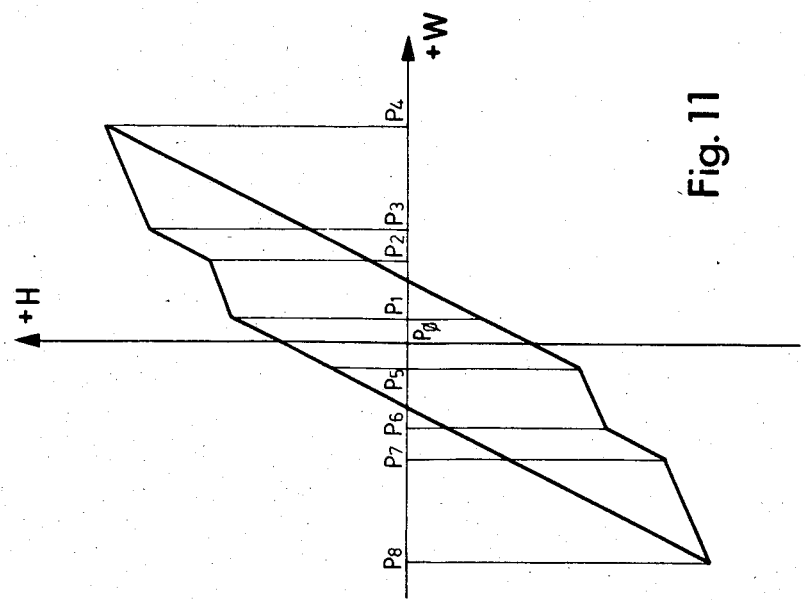
FIG. 11 schematically shows a diagram of the grinding stroke limitations according to FIG. 9.

Table 1 for the digital control of the upper grinding stroke limit $H_o$ by the interpolation of linear functions $H = f(W)$ for the case $b > b'$ according to FIG. 11 is given hereinbefore.

Table 2 for the digital control of the lower grinding stroke limit $H_u$ by the interpolation of linear functions $H = f(W)$ for the case $b < b'$ according to FIG. 11 is given hereinbefore.

Figure 12:
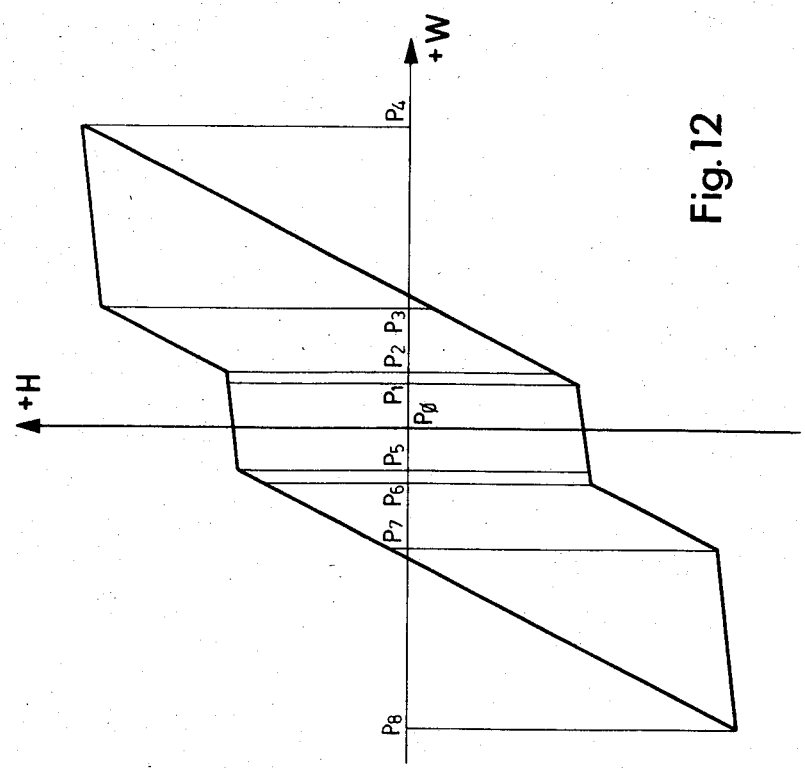
FIG. 12 schematically shows a diagram of grinding stroke limitations according to FIG. 10.

Table 3 for the digital control of the upper grinding stroke limit $H_o$ by the interpolation of linear functions $H = f(W)$ for the case $b > b'$ according to FIG. 12 is given hereinbefore.

Table 4 for the digital control of the lower grinding stroke limit $H_u$ by the interpolation of linear functions $H = f(W)$ for the case $b < b'$ according to FIG. 12 is given hereinbefore.

While there are shown and described present preferred embodiments of the invention, it is to be distinctly understood that the invention is not limited thereto, but may be otherwise variously embodied and practiced within the scope of the following claims.

Accordingly, what we claim is:

1. A method for controlling a magnitude and position of a stroke motion of a gear tooth flank grinding machine operating on an indexing generating principle when grinding a helically toothed gear by means of a doubly conical grinding wheel reciprocatable in grinding strokes along the gear tooth flanks being ground and wherein the stroke motion is controlled in dependence of measured values of a generating motion and of a momentary position of the grinding wheel upon the gear tooth flank being ground, comprising the steps of:

establishing a grinding reference polygon $P_1\ P_2\ P_3\ P_4\ P_5\ P_6\ P_7\ P_8$ defining grinding stroke limits $H_o$, $H_u$ from gearing specifications in accordance with hereinafter given formula Tables 1, 2, 3 and 4;

determining an effective grinding point S of the grinding wheel at predetermined time intervals from measurements of momentary generation and stroke positions W and H of the gear tooth flank grinding machine;

determining spacing Q of said effective grinding point S from the subsequent grinding stroke limit $H_o$, $H_u$ in a direction of said stroke motion; and controlling a path and speed of said stroke motion such that the stroke motion reverses at each grinding stroke limit $H_o$, $H_u$ defined by the grinding reference polygon $P_1\ P_2\ P_3\ P_4\ P_5\ P_6\ P_7\ P_8$;

Tables 1 and 2 for the case where b is greater than b':

| ZONE | UPPER GRINDING STROKE LIMIT $H_o$ |
|---|---|
| $P_0$–$P_1$ | $H_o = \dfrac{Q_2 - Q_1}{Q_2 - Q_1} \cdot \dfrac{\sin\alpha_t}{\sin\gamma} \cdot W + \dfrac{Q_1(Q_2 - Q_1)}{Q_2 - Q_1}$ |
| | $= \dfrac{\sin\alpha_t}{\sin\gamma} \cdot W + Q_1$ |
| $P_1$–$P_2$ | $H_o = \dfrac{(Q_4 + Q_7) - Q_2}{Q_7 - (Q_2 - Q_1)} \cdot \dfrac{\sin\alpha_t}{\sin\gamma} \cdot W +$ |
| | $\dfrac{Q_2 Q_7 - (Q_4 + Q_7)(Q_2 - Q_1)}{Q_7 - (Q_2 - Q_1)}$ |
| | $= \sin^2\gamma \cdot \dfrac{\sin\alpha_t}{\sin\gamma} \cdot W +$ |
| | $\dfrac{Q_2 Q_7 - (Q_4 + Q_7)(Q_2 - Q_1)}{Q_7 - (Q_2 - Q_1)}$ |

-continued $P_2$-$P_3$  $H_o = \dfrac{Q_6 - (Q_4 + Q_7)}{(Q_6 - Q_4) - Q_7} \cdot \dfrac{\sin\alpha_t}{\sin\gamma} \cdot W +$ $\dfrac{(Q_4 + Q_7)(Q_6 - Q_4) - Q_6 Q_7}{(Q_6 - Q_4) - Q_7}$ $= \dfrac{\sin\alpha_t}{\sin\gamma} \cdot W + \dfrac{(Q_4 + Q_7)(Q_6 - Q_4) - Q_6 Q_7}{(Q_6 - Q_4) - Q_7}$ $P_3$-$P_4$  $H_o = \dfrac{Q_3 - Q_6}{(Q_3 + Q_1) - (Q_6 - Q_4)} \cdot \dfrac{\sin\alpha_t}{\sin\gamma} \cdot W +$ $\dfrac{Q_6(Q_3 + Q_1) - Q_3(Q_6 - Q_4)}{(Q_3 + Q_1) - (Q_6 - Q_4)}$ $= \sin^2\gamma \cdot \dfrac{\sin\alpha_t}{\sin\gamma} \cdot W +$ $\dfrac{Q_6(Q_3 + Q_1) - Q_3(Q_6 - Q_4)}{(Q_3 + Q_1) - (Q_6 - Q_4)}$ $P_0$-$P_8$  $H_o = \dfrac{-Q_3 - Q_1}{-(Q_3 + Q_1)} \cdot \dfrac{\sin\alpha_t}{\sin\gamma} \cdot W + \dfrac{-Q_1(Q_3 - Q_1)}{-(Q_3 + Q_1)}$ $= \dfrac{\sin\alpha_t}{\sin\gamma} \cdot W + Q_1$

| ZONE | LOWER GRINDING STROKE LIMIT $H_u$ |
|---|---|
| $P_0$-$P_4$ | $H_u = \dfrac{Q_3 + Q_1}{Q_3 + Q_1} \cdot \dfrac{\sin\alpha_t}{\sin\gamma} \cdot W + \dfrac{-Q_1(Q_3 + Q_1)}{Q_3 + Q_1}$ $= \dfrac{\sin\alpha_t}{\sin\gamma} \cdot W - Q_1$ |
| $P_0$-$P_5$ | $H_u = \dfrac{-Q_2 + Q_1}{-(Q_2 - Q_1)} \cdot \dfrac{\sin\alpha_t}{\sin\gamma} \cdot W + \dfrac{Q_1(Q_2 - Q_1)}{-(Q_2 - Q_1)}$ $= \dfrac{\sin\alpha_t}{\sin\gamma} \cdot W - Q_1$ |
| $P_5$-$P_6$ | $H_u = \dfrac{-(Q_4 + Q_7) + Q_2}{-Q_7 + (Q_2 - Q_1)} \cdot \dfrac{\sin\alpha_t}{\sin\gamma} \cdot W +$ $\dfrac{Q_2 Q_7 - (Q_4 + Q_7)(Q_2 - Q_1)}{-Q_7 + (Q_2 - Q_1)}$ $= \sin^2\gamma \cdot \dfrac{\sin\alpha_t}{\sin\gamma} \cdot W +$ $\dfrac{Q_2 Q_7 - (Q_4 + Q_7)(Q_2 - Q_1)}{-Q_7 + (Q_2 - Q_1)}$ |
| $P_6$-$P_7$ | $H_u = \dfrac{-Q_6 + (Q_4 + Q_7)}{-(Q_6 - Q_4) + Q_7} \cdot \dfrac{\sin\alpha_t}{\sin\gamma} \cdot W +$ $\dfrac{(Q_4 + Q_7)(Q_6 - Q_4) - Q_6 Q_7}{-(Q_6 - Q_4) + Q_7}$ $= \dfrac{\sin\alpha_t}{\sin\gamma} \cdot W + \dfrac{(Q_4 + Q_7)(Q_6 - Q_4) - Q_6 Q_7}{-(Q_6 - Q_4) + Q_7}$ |
| $P_7$-$P_8$ | $H_u = \dfrac{-Q_3 + Q_6}{-(Q_3 + Q_1) + (Q_6 - Q_4)} \cdot \dfrac{\sin\alpha_t}{\sin\gamma} \cdot W +$ $\dfrac{Q_6(Q_3 + Q_1) - Q_3(Q_6 - Q_4)}{-(Q_3 + Q_1) + (Q_6 - Q_4)}$ $= \sin^2\gamma \cdot \dfrac{\sin\alpha_t}{\sin\gamma} \cdot W +$ $\dfrac{Q_6(Q_3 + Q_1) - Q_3(Q_6 - Q_4)}{-(Q_3 + Q_1) + (Q_6 - Q_4)}$ |

Formula Tables 3 and 4 for the case where b is less than b':

| ZONE | UPPER GRINDING STROKE LIMIT $H_o$ |
|---|---|
| $P_0$-$P_2$ | $H_o = \dfrac{(Q_4 + Q_7) - [Q_2 + (Q_1 - Q_2)\sin^2\gamma]}{Q_7} \cdot \dfrac{\sin\alpha_t}{\sin\gamma} \cdot$ $W + \dfrac{[Q_2 + (Q_1 - Q_2)\sin^2\gamma]Q_7}{Q_7}$ $= \sin^2\gamma \cdot \dfrac{\sin\alpha_t}{\sin\gamma} \cdot W + [Q_2 + (Q_1 - Q_2)\sin^2\gamma]$ |
| $P_2$-$P_3$ | $H_o = \dfrac{Q_6 - (Q_4 + Q_7)}{(Q_6 - Q_4) - Q_7} \cdot \dfrac{\sin\alpha_t}{\sin\gamma} \cdot W +$ $\dfrac{(Q_4 + Q_7)(Q_6 - Q_4) - Q_6 Q_7}{(Q_6 - Q_4) - Q_7}$ $= \dfrac{\sin\alpha_t}{\sin\gamma} \cdot W + \dfrac{(Q_4 + Q_7)(Q_6 - Q_4) - Q_6 Q_7}{(Q_6 - Q_4) - Q_7}$ |
| $P_3$-$P_4$ | $H_o = \dfrac{Q_3 - Q_6}{(Q_3 + Q_1) - (Q_6 - Q_4)} \cdot \dfrac{\sin\alpha_t}{\sin\gamma} \cdot W +$ $\dfrac{Q_6(Q_3 + Q_1) - Q_3(Q_6 - Q_4)}{(Q_3 + Q_1) - (Q_6 - Q_4)}$ $= \sin^2\gamma \cdot \dfrac{\sin\alpha_t}{\sin\gamma} \cdot W +$ $\dfrac{Q_6(Q_3 + Q_1) - Q_3(Q_6 - Q_4)}{(Q_3 + Q_1) - (Q_6 - Q_4)}$ |
| $P_0$-$P_5$ | $H_o = \dfrac{Q_2 - [Q_2 + (Q_1 - Q_2)\sin^2\gamma]}{-(Q_1 - Q_2)} \cdot \dfrac{\sin\alpha_t}{\sin\gamma} \cdot W +$ $\dfrac{-[Q_2 + (Q_1 - Q_2)\sin^2\gamma](Q_1 - Q_2)}{-(Q_1 - Q_2)}$ $= \sin^2\gamma \cdot \dfrac{\sin\alpha_t}{\sin\gamma} \cdot W + [Q_2 + (Q_1 - Q_2)\sin^2\gamma]$ |
| $P_5$-$P_8$ | $H_o = \dfrac{-Q_3 - Q_2}{-(Q_3 + Q_1) + (Q_1 - Q_2)} \cdot \dfrac{\sin\alpha_t}{\sin\gamma} \cdot W +$ $\dfrac{-Q_2(Q_3 + Q_1) - Q_3(Q_1 - Q_2)}{-(Q_3 + Q_1) + (Q_1 - Q_2)}$ $= \dfrac{\sin\alpha_t}{\sin\gamma} \cdot W + \dfrac{-Q_2(Q_3 + Q_1) - Q_3(Q_1 - Q_2)}{-(Q_3 + Q_2)}$ |

| ZONE | LOWER GRINDING STROKE LIMIT $H_u$ |
|---|---|
| $P_0$-$P_1$ | $H_u = \dfrac{-Q_2 + [Q_2 + (Q_1 - Q_2)\sin^2\gamma]}{(Q_1 - Q_2)} \cdot \dfrac{\sin\alpha_t}{\sin\gamma} \cdot W +$ $\dfrac{-[Q_2 + (Q_1 - Q_2)\sin^2\gamma](Q_1 - Q_2)}{(Q_1 - Q_2)}$ $= \sin^2\gamma \cdot \dfrac{\sin\alpha_t}{\sin\gamma} \cdot W - [Q_2 + (Q_1 - Q_2)\sin^2\gamma]$ |
| $P_1$-$P_4$ | $H_u = \dfrac{Q_3 + Q_2}{(Q_3 + Q_1) - (Q_1 - Q_2)} \cdot \dfrac{\sin\alpha_t}{\sin\gamma} \cdot W +$ $\dfrac{-Q_2(Q_3 + Q_1) - Q_3(Q_1 - Q_2)}{(Q_3 + Q_1) - (Q_1 - Q_2)}$ $= \dfrac{\sin\alpha_t}{\sin\gamma} \cdot W + \dfrac{-Q_2(Q_3 + Q_1) - Q_3(Q_1 - Q_2)}{Q_3 + Q_2}$ |
| $P_0$-$P_6$ | $H_u = \dfrac{-(Q_4 + Q_7) + [Q_2 + (Q_1 - Q_2)\sin^2\gamma]}{Q_7} \cdot \dfrac{\sin\alpha_t}{\sin\gamma} \cdot$ |

-continued $$P_5\text{-}P_6 \quad W + \frac{-[Q_2 + (Q_1 - Q_2)\sin^2\gamma]Q_7}{Q_7}$$

$$= \sin^2\gamma \cdot \frac{\sin\alpha_t}{\sin\gamma} \cdot W - [Q_2 + (Q_1 - Q_2)\sin^2\gamma]$$

$$P_6\text{-}P_7 \quad H_u = \frac{-Q_6 + (Q_4 + Q_7)}{-(Q_6 - Q_4) + Q_7} \cdot \frac{\sin\alpha_t}{\sin\gamma} \cdot W +$$

$$\frac{(Q_4 + Q_7)(Q_6 - Q_4) - Q_6 Q_7}{-(Q_6 - Q_4) + Q_7}$$

$$= \frac{\sin\alpha_t}{\sin\gamma} \cdot W + \frac{(Q_4 + Q_7)(Q_6 - Q_4) - Q_6 Q_7}{-(Q_6 - Q_4) + Q_7}$$

$$P_7\text{-}P_8 \quad H_u = \frac{-Q_3 + Q_6}{-(Q_3 + Q_1) + (Q_6 - Q_4)} \cdot \frac{\sin\alpha_t}{\sin\gamma} \cdot W +$$

$$\frac{Q_6(Q_3 + Q_1) - Q_3(Q_6 - Q_4)}{-(Q_3 + Q_1) + (Q_6 - Q_4)}$$

$$= \sin^2\gamma \cdot \frac{\sin\alpha_t}{\sin\gamma} \cdot W +$$

$$\frac{Q_6(Q_3 + Q_1) - Q_3(Q_6 - Q_4)}{-(Q_3 + Q_1) + (Q_6 - Q_4)}$$

wherein:
$P_o$=Point of impingement upon the normal projection of two adjacent gear tooth flanks the projection of points $P_{o1}$ and $P_{o2}$;
$P_{o1}$=point of impingement of normal through generation point $W_o$ on basic rack tooth profile flank 1;
$P_{o2}$=point of impingement of normal through generation point $W_o$ on basic rack tooth profile flank 2;
$P_1$–$P_8$=respective apex reference points of said grinding reference polygon;
$Q_1$–$Q_4$, $Q_6$ and $Q_7$=respective spacings from said point of impingement $P_o$ to exit points of said grinding wheel from surfaces of said gear tooth flanks at tooth tip flank lines and tooth root flank lines in a normal projection of two adjacent gear tooth flanks (intersection of generatrices or extensions of said generatrices with said tooth tip flank lines and said tooth root flank lines);
$H_o$=an upper value of grinding stroke limit;
$H_u$=a lower value of said grinding stroke limit;
$\alpha_t$=transverse pressure angle;
$\gamma$=angle between flank contact line and root line;
w=Generating travel.

2. The method as defined in cliam 1, wherein:
the grinding reference polygon is octagonal.

3. A method for controlling a magnitude and position of a stroke motion of a gear tooth flank grinding machine operating on an indexing generating principle when grinding a helically toothed gear by means of a pair of singly conical grinding wheels reciprocatable in grinding strokes along the gear tooth flanks being ground and wherein the stroke motion is controlled in dependence of measured values of a generating motion and of a momentary position of the grinding wheel pair upon the gear tooth flank being ground, comprising the steps of:
establishing a grinding reference polygon $P_0 P_1 P_2 P_3 P_4 P_5 P_6 P_7 P_8$ defining grinding stroke limits $H_o$, $H_u$ from gearing specifications in accordance with formula Tables 1, 2, 3 and 4;
determining an effective grinding point S of the grinding wheel pair at short time intervals from measurements of momentary generation and stroke positions W and H of the gear tooth flank grinding machine;
determining spacing Q of said effective grinding point S from the subsequent grinding stroke limit $H_o$, $H_u$ in a direction of said stroke motion; and
controlling a path and speed of said stroke motion such that the stroke motion reverses at each grinding stroke limit $H_o$, $H_u$ defined by the grinding reference polygon $P_0 P_1 P_2 P_3 P_4 P_5 P_6 P_7 P_8$;
Tables 1 and 2 for the case where b is greater than b':

| ZONE | UPPER GRINDING STROKE LIMIT $H_o$ |
|---|---|
| $P_0$-$P_1$ | $H_o = \frac{Q_2 - Q_1}{Q_2 - Q_1} \cdot \frac{\sin\alpha_t}{\sin\gamma} \cdot W + \frac{Q_1(Q_2 - Q_1)}{Q_2 - Q_1}$ |
| | $= \frac{\sin\alpha_t}{\sin\gamma} \cdot W + Q_1$ |
| $P_1$-$P_2$ | $H_o = \frac{(Q_4 + Q_7) - Q_2}{Q_7 - (Q_2 - Q_1)} \cdot \frac{\sin\alpha_t}{\sin\gamma} \cdot W +$ |
| | $\frac{Q_2 Q_7 - (Q_4 + Q_7)(Q_2 - Q_1)}{Q_7 - (Q_2 - Q_1)}$ |
| | $= \sin^2\gamma \cdot \frac{\sin\alpha_t}{\sin\gamma} \cdot W +$ |
| | $\frac{Q_2 Q_7 - (Q_4 + Q_7)(Q_2 - Q_1)}{Q_7 - (Q_2 - Q_1)}$ |
| $P_2$-$P_3$ | $H_o = \frac{Q_6 - (Q_4 + Q_7)}{(Q_6 - Q_4) - Q_7} \cdot \frac{\sin\alpha_t}{\sin\gamma} \cdot W +$ |
| | $\frac{(Q_4 + Q_7)(Q_6 - Q_4) - Q_6 Q_7}{(Q_6 - Q_4) - Q_7}$ |
| | $= \frac{\sin\alpha_t}{\sin\gamma} \cdot W + \frac{(Q_4 + Q_7)(Q_6 - Q_4) - Q_6 Q_7}{(Q_6 - Q_4) - Q_7}$ |
| $P_3$-$P_4$ | $H_o = \frac{Q_3 - Q_6}{(Q_3 + Q_1) - (Q_6 - Q_4)} \cdot \frac{\sin\alpha_t}{\sin\gamma} \cdot W +$ |
| | $\frac{Q_6(Q_3 + Q_1) - Q_3(Q_6 - Q_4)}{(Q_3 + Q_1) - (Q_6 - Q_4)}$ |
| | $= \sin^2\gamma \cdot \frac{\sin\alpha_t}{\sin\gamma} \cdot W +$ |
| | $\frac{Q_6(Q_3 + Q_1) - Q_3(Q_6 - Q_4)}{(Q_3 + Q_1) - (Q_6 - Q_4)}$ |
| $P_0$-$P_8$ | $H_o = \frac{-Q_3 - Q_1}{-(Q_3 + Q_1)} \cdot \frac{\sin\alpha_t}{\sin\gamma} \cdot W + \frac{-Q_1(Q_3 - Q_1)}{-(Q_3 + Q_1)}$ |
| | $= \frac{\sin\alpha_t}{\sin\gamma} \cdot W + Q_1$ |

| ZONE | LOWER GRINDING STROKE LIMIT $H_u$ |
|---|---|
| $P_0$-$P_4$ | $H_u = \frac{Q_3 + Q_1}{Q_3 + Q_1} \cdot \frac{\sin\alpha_t}{\sin\gamma} \cdot W + \frac{-Q_1(Q_3 + Q_1)}{Q_3 + Q_1}$ |
| | $= \frac{\sin\alpha_t}{\sin\gamma} \cdot W - Q_1$ |
| $P_0$-$P_5$ | $H_u = \frac{-Q_2 + Q_1}{-(Q_2 - Q_1)} \cdot \frac{\sin\alpha_t}{\sin\gamma} \cdot W + \frac{Q_1(Q_2 - Q_1)}{-(Q_2 - Q_1)}$ |
| | $= \frac{\sin\alpha_t}{\sin\gamma} \cdot W - Q_1$ |

-continued

| | |
|---|---|
| $P_5$-$P_6$ | $H_u = \dfrac{-(Q_4 + Q_7) + Q_2}{-Q_7 + (Q_2 - Q_1)} \cdot \dfrac{\sin\alpha_t}{\sin\gamma} \cdot W +$ $\dfrac{Q_2Q_7 - (Q_4 + Q_7)(Q_2 - Q_1)}{-Q_7 + (Q_2 - Q_1)}$ $= \sin^2\gamma \cdot \dfrac{\sin\alpha_t}{\sin\gamma} \cdot W +$ $\dfrac{Q_2Q_7 - (Q_4 + Q_7)(Q_2 - Q_1)}{-Q_7 + (Q_2 - Q_1)}$ |
| $P_6$-$P_7$ | $H_u = \dfrac{-Q_6 + (Q_4 + Q_7)}{-(Q_6 - Q_4) + Q_7} \cdot \dfrac{\sin\alpha_t}{\sin\gamma} \cdot W +$ $\dfrac{(Q_4 + Q_7)(Q_6 - Q_4) - Q_6Q_7}{-(Q_6 - Q_4) + Q_7}$ $= \dfrac{\sin\alpha_t}{\sin\gamma} \cdot W + \dfrac{(Q_4 + Q_7)(Q_6 - Q_4) - Q_6Q_7}{-(Q_6 - Q_4) + Q_7}$ |
| $P_7$-$P_8$ | $H_u = \dfrac{-Q_3 + Q_6}{-(Q_3 + Q_1) + (Q_6 - Q_4)} \cdot \dfrac{\sin\alpha_t}{\sin\gamma} \cdot W +$ $\dfrac{Q_6(Q_3 + Q_1) - Q_3(Q_6 - Q_4)}{-(Q_3 + Q_1) + (Q_6 - Q_4)}$ $= \sin^2\gamma \cdot \dfrac{\sin\alpha_t}{\sin\gamma} \cdot W +$ $\dfrac{Q_6(Q_3 + Q_1) - Q_3(Q_6 - Q_4)}{-(Q_3 + Q_1) + (Q_6 - Q_4)}$ |

Formula Tables 3 and 4 for the case where b is less than b':

| ZONE | UPPER GRINDING STROKE LIMIT $H_o$ |
|---|---|
| $P_0$-$P_2$ | $H_o = \dfrac{(Q_4 + Q_7) - [Q_2 + (Q_1 - Q_2)\sin^2\gamma]}{Q_7} \cdot \dfrac{\sin\alpha_t}{\sin\gamma} \cdot W + \dfrac{[Q_2 + (Q_1 - Q_2)\sin^2\gamma]Q_7}{Q_7}$ $= \sin^2\gamma \cdot \dfrac{\sin\alpha_t}{\sin\gamma} \cdot W + [Q_2 + (Q_1 - Q_2)\sin^2\gamma]$ |
| $P_2$-$P_3$ | $H_o = \dfrac{Q_6 - (Q_4 + Q_7)}{(Q_6 - Q_4) - Q_7} \cdot \dfrac{\sin\alpha_t}{\sin\gamma} \cdot W + \dfrac{(Q_4 + Q_7)(Q_6 - Q_4) - Q_6Q_7}{(Q_6 - Q_4) - Q_7}$ $= \dfrac{\sin\alpha_t}{\sin\gamma} \cdot W + \dfrac{(Q_4 + Q_7)(Q_6 - Q_4) - Q_6Q_7}{(Q_6 - Q_4) - Q_7}$ |
| $P_3$-$P_4$ | $H_o = \dfrac{Q_3 - Q_6}{(Q_3 + Q_1) - (Q_6 - Q_4)} \cdot \dfrac{\sin\alpha_t}{\sin\gamma} \cdot W + \dfrac{Q_6(Q_3 + Q_1) - Q_3(Q_6 - Q_4)}{(Q_3 + Q_1) - (Q_6 - Q_4)}$ $= \sin^2\gamma \cdot \dfrac{\sin\alpha_t}{\sin\gamma} \cdot W + \dfrac{Q_6(Q_3 + Q_1) - Q_3(Q_6 - Q_4)}{(Q_3 + Q_1) - (Q_6 - Q_4)}$ |
| $P_0$-$P_5$ | $H_o = \dfrac{Q_2 - [Q_2 + (Q_1 - Q_2)\sin^2\gamma]}{-(Q_1 - Q_2)} \cdot \dfrac{\sin\alpha_t}{\sin\gamma} \cdot W + \dfrac{-[Q_2 + (Q_1 - Q_2)\sin^2\gamma](Q_1 - Q_2)}{-(Q_1 - Q_2)}$ $= \sin^2\gamma \cdot \dfrac{\sin\alpha_t}{\sin\gamma} \cdot W + [Q_2 + (Q_1 - Q_2)\sin^2\gamma]$ |
| $P_5$-$P_8$ | $H_o = \dfrac{-Q_3 - Q_2}{-(Q_3 + Q_1) + (Q_1 - Q_2)} \cdot \dfrac{\sin\alpha_t}{\sin\gamma} \cdot W + \dfrac{-Q_2(Q_3 + Q_1) - Q_3(Q_1 - Q_2)}{-(Q_3 + Q_1) + (Q_1 - Q_2)}$ $= \dfrac{\sin\alpha_t}{\sin\gamma} \cdot W + \dfrac{-Q_2(Q_3 + Q_1) - Q_3(Q_1 - Q_2)}{-(Q_3 + Q_2)}$ |

| ZONE | LOWER GRINDING STROKE LIMIT $H_u$ |
|---|---|
| $P_0$-$P_1$ | $H_u = \dfrac{-Q_2 + [Q_2 + (Q_1 - Q_2)\sin^2\gamma]}{(Q_1 - Q_2)} \cdot \dfrac{\sin\alpha_t}{\sin\gamma} \cdot W + \dfrac{-[Q_2 + (Q_1 - Q_2)\sin^2\gamma](Q_1 - Q_2)}{(Q_1 - Q_2)}$ $= \sin^2\gamma \cdot \dfrac{\sin\alpha_t}{\sin\gamma} \cdot W - [Q_2 + (Q_1 - Q_2)\sin^2\gamma]$ |
| $P_1$-$P_4$ | $H_u = \dfrac{Q_3 + Q_2}{(Q_3 + Q_1) - (Q_1 - Q_2)} \cdot \dfrac{\sin\alpha_t}{\sin\gamma} \cdot W + \dfrac{-Q_2(Q_3 + Q_1) - Q_3(Q_1 - Q_2)}{(Q_3 + Q_1) - (Q_1 - Q_2)}$ $= \dfrac{\sin\alpha_t}{\sin\gamma} \cdot W + \dfrac{-Q_2(Q_3 + Q_1) - Q_3(Q_1 - Q_2)}{Q_3 + Q_2}$ |
| $P_0$-$P_6$ | $H_u = \dfrac{-(Q_4 + Q_7) + [Q_2 + (Q_1 - Q_2)\sin^2\gamma]}{Q_7} \cdot \dfrac{\sin\alpha_t}{\sin\gamma} \cdot W + \dfrac{-[Q_2 + (Q_1 - Q_2)\sin^2\gamma]Q_7}{Q_7}$ $= \sin^2\gamma \cdot \dfrac{\sin\alpha_t}{\sin\gamma} \cdot W - [Q_2 + (Q_1 - Q_2)\sin^2\gamma]$ |
| $P_6$-$P_7$ | $H_u = \dfrac{-Q_6 + (Q_4 + Q_7)}{-(Q_6 - Q_4) + Q_7} \cdot \dfrac{\sin\alpha_t}{\sin\gamma} \cdot W + \dfrac{(Q_4 + Q_7)(Q_6 - Q_4) - Q_6Q_7}{-(Q_6 - Q_4) + Q_7}$ $= \dfrac{\sin\alpha_t}{\sin\gamma} \cdot W + \dfrac{(Q_4 + Q_7)(Q_6 - Q_4) - Q_6Q_7}{-(Q_6 - Q_4) + Q_7}$ |
| $P_7$-$P_8$ | $H_u = \dfrac{-Q_3 + Q_6}{-(Q_3 + Q_1) + (Q_6 - Q_4)} \cdot \dfrac{\sin\alpha_t}{\sin\gamma} \cdot W + \dfrac{Q_6(Q_3 + Q_1) - Q_3(Q_6 - Q_4)}{-(Q_3 + Q_1) + (Q_6 - Q_4)}$ $= \sin^2\gamma \cdot \dfrac{\sin\alpha_t}{\sin\gamma} \cdot W + \dfrac{Q_6(Q_3 + Q_1) - Q_3(Q_6 - Q_4)}{-(Q_3 + Q_1) + (Q_6 - Q_4)}$ | wherein:

$P_o$ = point of impingement upon the normal projection of two adjacent gear tooth flanks the projection of points $P_{o1}$ and $P_{o2}$;

$P_{o1}$ = point of impingement of normal through generation point $W_o$ on basic rack tooth profile flank 1;

$P_{o2}$ = point of impingement of normal through generation point $W_o$ on basic rack tooth profile flank 2;

$P_1$-$P_8$ = respective apex reference points of said grinding reference polygon;

$Q_1$-$Q_4$, $Q_6$ and $Q_7$ = respective spacings from said point of impingement $P_o$ to exit points of said grinding wheel from surfaces of said gear tooth flanks at tooth tip flank lines and tooth root flank lines in a normal projection of two adjacent gear tooth flanks (intersection of generatrices or extensions of said generatrices with said tooth tip flank lines and said tooth root flank lines);

$H_o$ = an upper value of grinding stroke limit;

$H_u$ = a lower value of said grinding stroke limit;

$\alpha_t$ = transverse pressure angle;

$\gamma$ = angle between flank contact line and root line;

$W$ = generating travel.

4. The method as defined in claim 3, wherein:
the grinding reference polygon is octagonal.

* * * * *

UNITED STATES PATENT AND TRADEMARK OFFICE
CERTIFICATE OF CORRECTION

PATENT NO. : 4,606,153
DATED : August 19, 1986
INVENTOR(S) : Peter Bloch and Robert Wydler It is certified that error appears in the above—identified patent and that said Letters Patent is hereby corrected as shown below:

Column 8, following line 7, please insert --Grinding machine adjustment value $L_F = L - (r - r_{fs}) \tan \alpha$ --

Signed and Sealed this

Eleventh Day of November, 1986

*Attest:*

DONALD J. QUIGG

*Attesting Officer*  *Commissioner of Patents and Trademarks*